(12) United States Patent
Murthy et al.

(10) Patent No.: US 8,155,531 B2
(45) Date of Patent: Apr. 10, 2012

(54) TUNABLE PHOTONIC INTEGRATED CIRCUITS

(75) Inventors: Sanjeev Murthy, Sunnyvale, CA (US);
Mark J. Missey, San Jose, CA (US);
Mehrdad Ziari, Pleasanton, CA (US);
Fred A. Kish, Jr., Palo Alto, CA (US);
Masaki Kato, Palo Alto, CA (US);
Radhakrishnan L. Nagarajan, Cupertino, CA (US)

(73) Assignee: Infinera Corporation, Sunnyvale, CA (US)

( * ) Notice: Subject to any disclaimer, the term of this patent is extended or adjusted under 35 U.S.C. 154(b) by 381 days.

(21) Appl. No.: 12/467,495

(22) Filed: May 18, 2009

(65) Prior Publication Data
US 2010/0290790 A1 Nov. 18, 2010

(51) Int. Cl.
*H04B 10/00* (2006.01)

(52) U.S. Cl. ........ 398/159; 398/158; 398/194; 398/193; 398/192; 398/91

(58) Field of Classification Search .................. 398/159, 398/158, 194, 193, 192, 91
See application file for complete search history.

(56) References Cited

U.S. PATENT DOCUMENTS

| 2008/0025726 A1* | 1/2008 | Welch et al. ................. 398/79 |
| 2008/0031626 A1* | 2/2008 | Welch et al. ................. 398/79 |

* cited by examiner

*Primary Examiner* — Kinam Park
(74) *Attorney, Agent, or Firm* — Harrity & Harrity LLP; David L. Soltz (57) ABSTRACT

Photonic integrated circuits (PICs) may include transmit and receive PICs that include individually tunable optical elements. In one implementation, a device may include a number of optical elements that form a number of optical channels. Tuners may be used to modify a property associated with the at least one of the optical elements where the modified properties of the optical elements adjust a frequency grid of the optical channels.

33 Claims, 9 Drawing Sheets

TUNABLE PHOTONIC INTEGRATED CIRCUITS

BACKGROUND

Optical networks communicate information over optical fiber using optical transmitters and optical receivers. The transmitters and receivers may each be implemented with photonic integrated circuits (PICs). A PIC is a device that may integrate multiple photonic functions such as modulation, amplification, power monitoring at multiple optical wavelengths on a single integrated device. PICs may be fabricated in a manner similar to electronic integrated circuits but, depending on the type of PIC, may incorporate one or more types of materials, including silica on silicon, silicon on insulator, various polymers, and semiconductor materials. Typically, semiconductor materials which may be used to make semiconductor lasers, such as III-V or II-VI semiconductor material systems, may be incorporated into the PIC. Such semiconductor materials include, but are not limited to InGaAsP, AlInGaAs, and GaInNAsSb systems. Hybrid PICs are also known that include silicon-based planar lightwave circuits (PLC) and III-V or II-VI based devices. Such hybrid PICs may be realized by transferring an epitaxial layer on a substrate and forming various optical components on the epitaxial layer.

PICs may include multiple optical sources, each of which outputting an optical signal at a corresponding one of a plurality of wavelengths. The optical signals are combined by an optical combiner and then output from the PIC as a wavelength division multiplexed (WDM) signal. The optical signal wavelengths within the WDM signal often conform to a spectral grid or "channel grid", whereby each wavelength is separated from another by a uniform spacing, e.g., 200 GHz. The International Telecommunications Union (ITU) has recommended a standard set of frequencies ("ITU grid"), which many WDM systems comply with. The channel grid frequencies often match the frequencies on the ITU grid.

One WDM system, however, may use a first subset of ITU grid frequencies, while another WDM system may use a second subset of ITU grid frequencies. Thus, a different PIC is often fabricated for each set of required frequencies. Accordingly, there is a need for PIC having an associated set of wavelengths, or channel grid that may be tuned over a wide spectral range so as to operate at multiple channel grid frequencies. Preferably, performance parameters of the PIC are maintained or exceeded over the tuning range.

SUMMARY

Consistent with the present disclosure, a network device is provided that includes a substrate and a plurality of optical sources provided on the substrate, as well as a plurality of optical elements or tuning elements. Each of the plurality of optical elements or tuning elements has a corresponding one of a plurality of dimensional and electro-optic parameter values, and each of the plurality of dimensional and/or electro-optic parameter values may be different or be "chirped" from one optical element to the next. For example, the length of each optical element may be vary from one optical element to the next, and may be sufficient to compensate for performance drift across a tuning range. In addition to or instead of varying the length of each optical element, one or more of the following parameters can be varied from one element to the next in order to provide performance drift compensation: width, strain in the epitaxial layers that are included in each optical element, and bandgap of a material included in each optical element.

Consistent with a further aspect of the present disclosure, a network device is provided that includes a plurality of optical paths provided on the substrate, each of which including a corresponding one of a plurality of optical sources and a corresponding one of the plurality of optical elements. Each of the plurality of optical sources supplies a corresponding one of a first plurality of optical signals. Each of the first plurality of optical signals has a corresponding one of a first plurality of wavelengths, the first plurality of wavelengths conforming to a first channel grid. Each of the first plurality of optical signals has a predetermined optical parameter, such as power or bit error rate (BER). Each of the plurality of optical sources can further be configured to output a second plurality of optical signals using the tuning elements. Each of the second plurality of optical signals has a corresponding one of a second plurality of wavelengths, which conform to a second channel grid that is spectrally shifted relative to the first wavelength grid. In addition, each of the second plurality of optical signals has a parameter that meets or exceeds the predetermined optical parameter.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

Implementations described herein may provide optical transmit and receive PICs that include individually tunable optical elements. The individually tunable optical elements can be used to customize the frequency grid and/or the performance for the PICs. In one implementation, the optical elements may be tuned to change the frequency grid based on one or more of thermal tuning, application of electrical stress, carrier injection, or electro-optic based techniques. In other possible implementations, tuning may be further enhanced by varying or chirping a particular parameter (for example, a dimensional parameter and/or an electro-optic parameter) associated with each of the tuning elements. For example, the tunable elements may include thermal heaters, each of which having or chirped or different resistance.

The tuning elements may be provided to tune each optical element individually on the PIC. Alternatively, a global tuning element may be provided to tune multiple optical elements at once. In one example, the global tuner can be used to compensate for fabrication-related systematic variations and the per optical element tuners can be used to compensate for random variations in the fabrication process. PICs can also include reflection suppression elements, such as an angled butt-joint or those disclosed in U.S. patent application Ser. No. 12/058,652, the contents of which are incorporated herein by reference. Performance of the PIC across the tuning range can be maintained by choice of bias currents and/or voltage on the different optical elements. In addition, the tuning range over which performance is met or exceeded can be enhanced by chirping the dimensional and/or electro-optic parameters of the optical elements. For instance, the length of each laser on the PIC may be different from one laser to the next and chosen based on average fabrication process variations. In addition or instead of varying the length of each optical element, one or more of the following parameters can be varied from one element to the next in order to provide performance drift compensation: width, strain in the epitaxial layers that are included in each optical element, and bandgap of a material included in each optical element. In addition, a bias voltage applied to each optical element may vary from one optical element to the next. Such bias voltage variations may be particularly effective in tuning optical elements that are typically reverse biased. The ability to customize the channel grid at which PICs meet or exceed performance parameters can allow for more rapid deployment of the PICs without demanding a large inventory.

Figure 1:
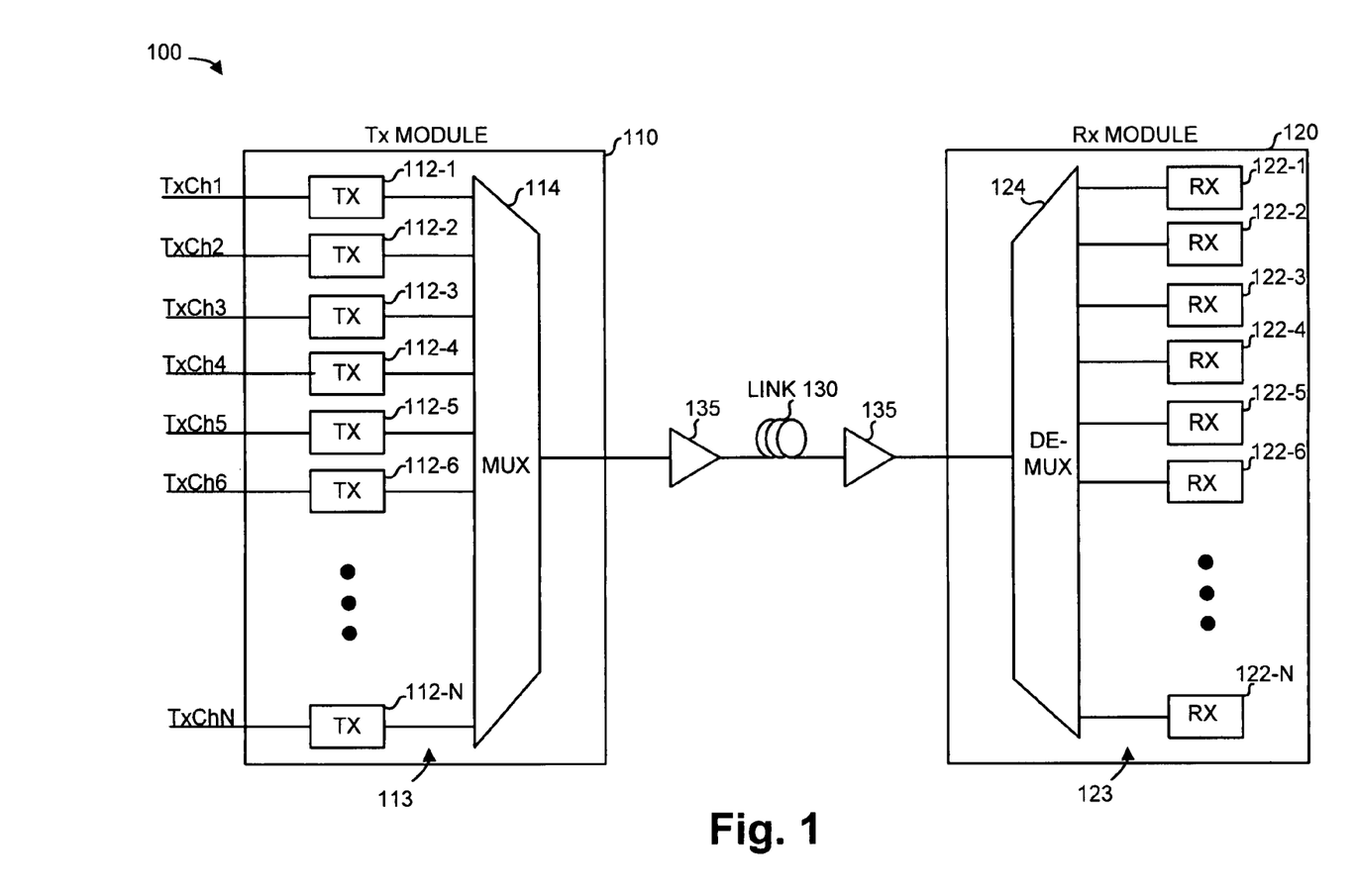
FIG. 1 is a diagram of an exemplary network in which systems and/or methods may be implemented.

FIG. 1 is a simplified diagram of an exemplary network 100 in which systems and/or methods described herein may be implemented. As illustrated, network 100 may include a transmit (Tx) module 110 that is optically coupled to a receive (Rx) module 120 via an optical medium or link 130. Link 130 may include one or more optical amplifiers 135 that amplify the optical signal as the optical signal is transmitted over link 130. Network 100 may include filters, switches, and other optical components.

Tx module 110 may include a number of optical transmitters (also referred to as transmitters herein) 112-1 through 112-N. Each optical transmitter 112 may emit a corresponding one of a plurality of optical signals, each of which having a corresponding one of wavelengths $\lambda 1$ to $\lambda N$. In addition, each optical signal may be modulated in accordance with a corresponding data stream (Data1 to DataN). Such modulation may be achieved by directly modulating a laser or through external modulation, in which light output from a laser is modulated by a modulator. The modulator may be an electro-absorption modulator, Mach-Zehnder interferometer or a band-edge Mach-Zehnder interferometer. The modulated signals are then amplified, and/or attenuated. In one implementation, Tx module 110 may include 10 optical transmitters 112 (i.e., N=10). In other possible implementations, more or fewer optical transmitters 112 may be used. Each optical transmitter 112 may be tuned to a designated wavelength. It may be desirable that the grid of wavelengths emitted by optical transmitters 112 conform to frequencies in a known standard, such as a standard published by the ITU-T, as discussed above.

The modulated optical signals are next combined with an optical multiplexer to form a wavelength divisional multiplexed (WDM) signal that is supplied to link 130. As noted above, other optical components, such as optical amplifiers 135 may be provided along link 130.

At Rx module 120, demultiplexer 124 may separate the WDM signal into its individual optical signals and provide the optical signals, via optical waveguides 123, to optical receivers 122-1 through 122-N. Optical receivers 122 may each include one or more photodetectors and amplitude varying elements (ZOAs) to receive the respective optical signals, convert the signals to a photocurrent, and provide an electrical signal representation of the original input signal.

Figure 2A:
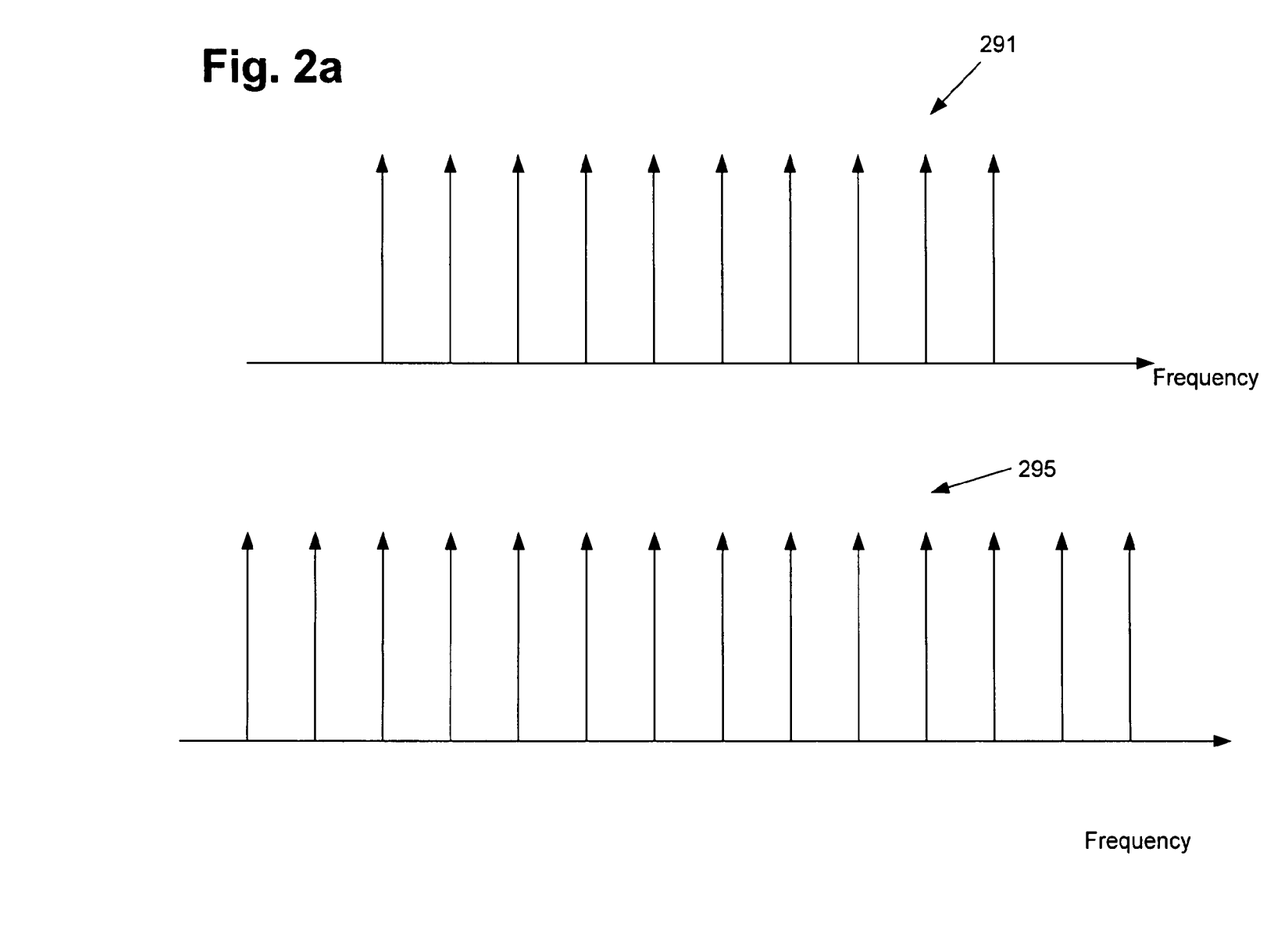
FIGS. 2a and 2b are diagrams illustrating exemplary frequency grids for an optical transmitter or receiver. The grid shown in FIG. 2a is spectrally shifted relative to the grid shown in FIG. 2b.

FIG. 2a shows arrows 291, each of which corresponding to a particular optical signal wavelength or frequency. As further shown in FIG. 2a, the optical signal frequencies are spectrally spaced from one another by a uniform amount and thus conform to a grid. Preferably, each optical signal frequency is one of the optical frequencies identified by the International Telecommunication Union as a standard frequency in a WDM system. The ITU grid is represented by arrows 295, which are also shown in FIG. 2a. In the example shown, ten optical signals (i.e., N=10), each spectrally spaced from one another by 200 GHz, have respective frequencies of approximately 191.7 THz, 191.9 THz, 192.1 THz, 192.3 THz, 192.5 THz, 192.7 THz, 192.9 THz, 193.1 THz, 193.3 THz, and 193.5 THz.

In some situations, various users of Tx module 110 and Rx module 120 may desire to use different frequency grids or different frequency spacings. Consistent with aspects herein, a tunable PIC may be provided that has a wavelength grid that can be changed or tuned over a relatively wide spectral range during the life of the PIC. Preferably, performance parameters, such as bit error rate (BER) and/or optical power associated with each optical signal are met or exceeded over the tuning range.

Figure 2B:
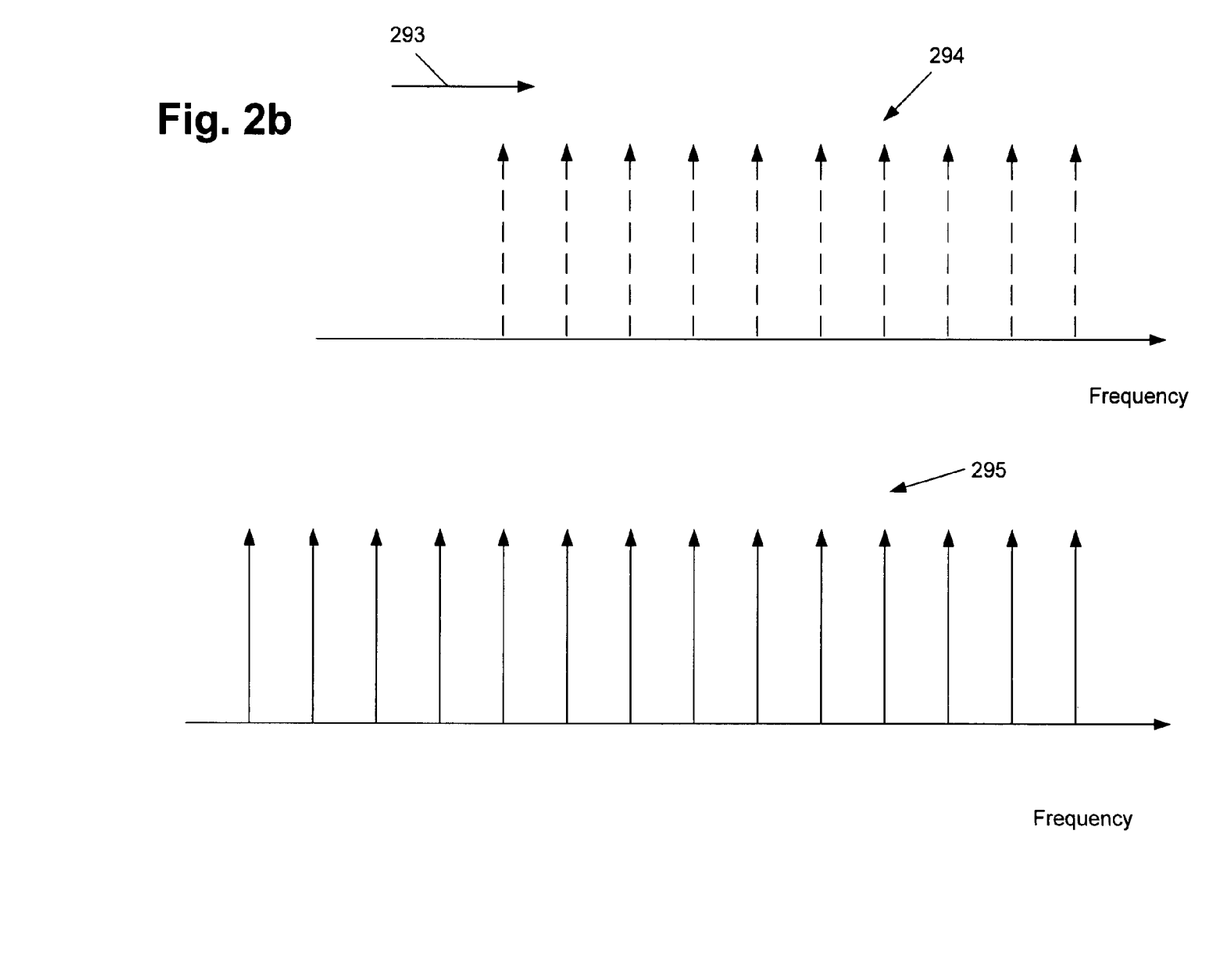

FIG. 2b illustrates the frequencies of additional optical signals output from transmitters 112 (see arrows 292), which are tuned or spectrally shifted in the direction indicated by arrow 293 relative to the frequencies shown in FIG. 2a. As further shown in FIG. 2b, the spectrally shifted frequencies may conform to the ITU grid represented by arrows 295 and maintain the spacing shown in FIG. 2a. Preferably, however, the optical signals output from transmitters 112 should meet or exceed performance parameters or criteria, such as bit error rate and power, over a relatively a wide tuning range.

Figure 3A:
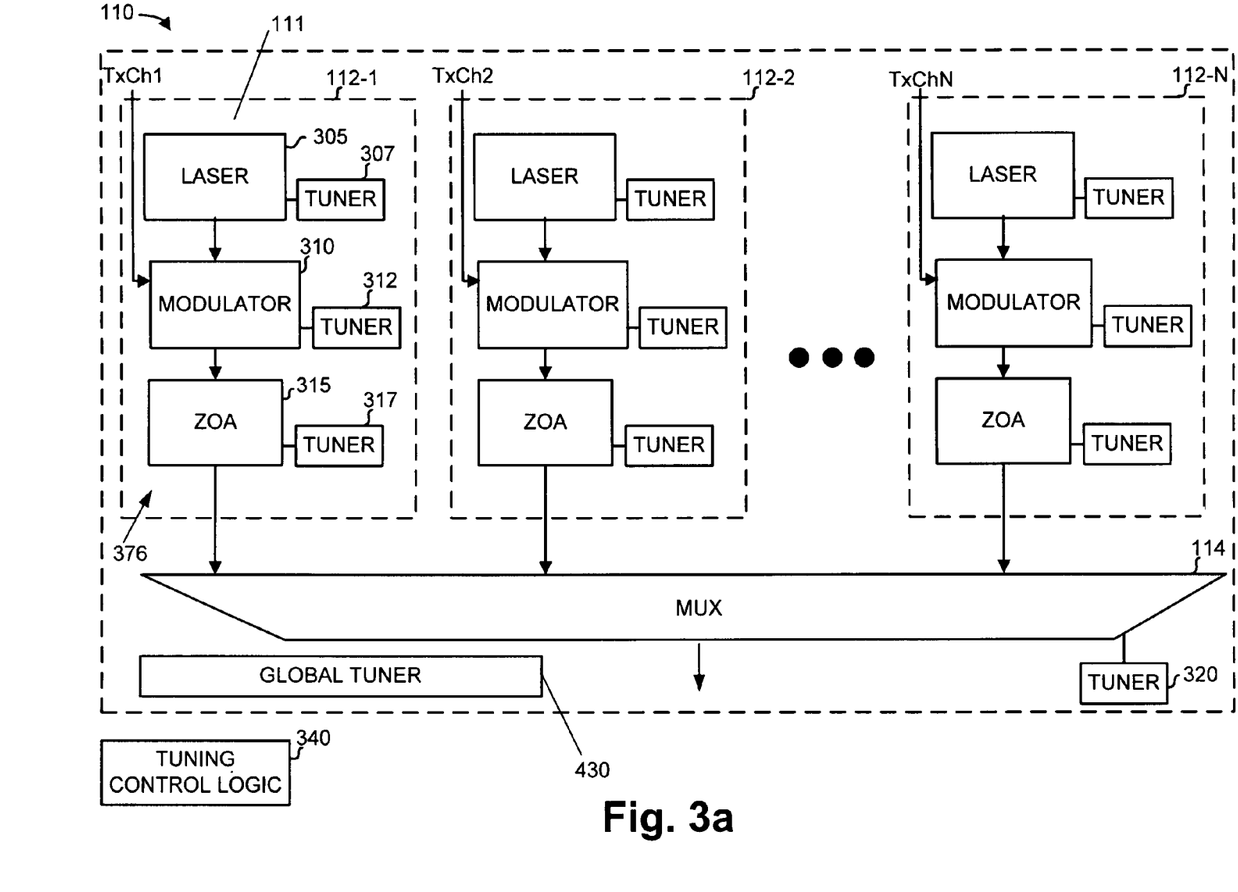
FIG. 3a is a diagram illustrating exemplary elements in a transmit module.

FIG. 3a is a diagram illustrating exemplary elements in Tx module 110. As shown, each of optical transmitters 112, such as optical transmitter 112-1, may include laser 305, modulator 310, and an amplitude varying element 315 (described in greater detail below) provided along optical path 376. The AVE may also be referred to as a "ZOA" herein. Tx module 110 may be formed as a PIC where the elements of the PIC e.g., each of optical transmitters 112 are formed on a substrate 111 or may be a hybrid where transmitter and substrate are from different material systems. Each of laser 305, modulator 310, and ZOA 315 may be coupled with a tuning element that can be used to tune the wavelength or performance of the optical signal output by the corresponding laser 305, modulator 310, or ZOA 315 and provided by each optical path 376 as an input to multiplexer 114. As particularly shown in FIG. 3a, tuner 307 is coupled to laser 305, tuner 312 is coupled with modulator 310, and tuner 317 is coupled with SOA 315. Multiplexer 114 may also be tunable. In one example, multiplexer 114 may be an arrayed waveguide grating (AWG) multiplexer coupled to a tuner 320 designed to allow the wavelengths of the input signal channel to multiplexer 114 to be tuned. Alternatively, tuner 317 may be provided to tune a group of optical elements (e.g., a multi-element tuner), instead of just one optical element. In addition global tuner 430 may be provided that includes, for example, an additional heater that heats multiple optical elements on the PIC. Multiplexer 114 may be temperature insensitive such that its transmission spectrum is substantially fixed over a predetermined range of temperatures. Typically, the end tuning state, such as the center wavelength of an optical element after it has been tuned, is the summation of the tuning effects of the global tuner, multi-element tuner, and individual tuner.

Substrate 11 and the optical elements provided thereon may include a III-V semiconductor material, a II-VI semiconductor material, or silicon. Each of the optical elements may also include a InGaAs P, AlInGaAs, or GaInNAlAsSb material systems, for example, wherein a percentage of each element in each of these compositions can vary from 0% to 100%.

It can be appreciated that optical transmitters 112 may include optical elements other than the plurality of optical elements shown in FIG. 3a. For instance, each of optical transmitters 112 may additionally include, for example, one or more power monitors to measure the power of the signal through the optical transmitter 112, under control of control logic 340.

Tuning control logic 340 is also shown in FIG. 3a and may be coupled to Tx module 110. Tuning control logic 340 may supply control signals to control or program the tuners, such as tuners 307, 312, 317, 320 and 430. Although not explicitly shown in FIG. 3a, tuning control logic 340 may connect to each of the tuners shown in FIG. 3a. Control logic 340 could actively tune the optical elements on the PIC during operation or could be based on look-up tables. In some implementations, tuning control logic 340 may be provided as a component separate from Tx module 110. A user may initially connect tuning control logic 340 to Tx module 110 when initially configuring Tx module 110. In other implementations, tuning control logic 340 may be implemented as part of Tx module 110.

Referring back to optical transmitter 112-1, laser 305 may include, for instance, a semiconductor laser such as a distributed feedback (DFB) laser or DBR laser. Laser 305 may provide its output optical light beam to modulator 310 or may be directly modulated. Each laser 305 may thus be an optical source for its corresponding optical transmitter 112 and collectively, the lasers may constitute a plurality of optical sources.

Modulator 310 may include an optical modulator such as an electro-absorption modulator (EAM) or a Mach-Zender Modulator (MZM) or band-edge MZM. The modulators may generally control (modulate) the intensity of its input laser beam, from laser 305, based on the data signal (i.e., the Data1 to DataN—should be added to the figures). Alternatively, modulator 310 may include a phase modulator, such as a differential quadrature phase shift keying (DQPSK) modulator, as described, for example in U.S. patent application Ser. No. 12/345,315, titled "HIGH CAPACITY TRANSMITTER IMPLEMENTED ON A PHOTONIC INTEGRATED CIRCUIT", the entire contents of which are incorporated herein by reference. In that case, the light output from laser is split into optical signals having different polarizations, with each polarization being modulated separately. Consistent with the present disclosure, each polarized optical signal may be subject to separate or different tuning.

The output of modulator 310 may be connected to ZOA 315. ZOA 315 is a generalized power flattening element which may be used as an amplifier or as an attenuator depending on the performance requirements. For example, the ZOA may be a device that, when forward biased, amplifies an incoming optical signal and acts as an amplifier, and, when reverse biased attenuates the incoming optical signal and acts as an attenuator. ZOAs are described in greater detail in U.S. Pat. No. 7,162,113, the entire contents of which are incorporated herein by reference. It is noted that the order of laser 305, modulator 310, and ZOA 315 may be changed. For example, ZOA 315 may be provided between laser 305 and modulator 310. Alternatively, the ZOA may be provided at the output of multiplexer 114 or may be split into multiple sections in the optical path. Further, optical paths 376 may include a waveguide and/or other passive optical components that feed the optical signals output from the optical elements to multiplexer 114. Typically, as shown in FIG. 3a, a plurality of optical paths are provided, each of which having an associated grouping of optical elements, such as a laser, modulator, and ZOA provided along the optical path. In addition, each optical path feeds a corresponding optical signal to multiplexer 114. The optical loss associated with each optical path may also be chirped.

The plurality of tuners 307, 312, 317, and 320 may generally each operate to modify properties of the optical element, with which they are associated, to change the center frequency or performance parameters of the optical element. For example, the center frequency or wavelength of an optical amplifier, may be defined, as that frequency or wavelength at which the amplifier has maximum gain. Similarly, the center frequency or wavelength of a modulator may be that frequency or wavelength at which the modulator has optimal performance, such as the wavelength at which the modulator has the highest extinction ratio. Further the center wavelength or frequency of a multiplexer or demultiplexer may be correspond to the center wavelength or frequency of a passband of the multiplexer or demultiplexer. Tuners 307, 312, 317, and 320 may be used, in the aggregate, to tune the center frequencies associated with each optical element connected along a given optical path, so that each optical path supplies an optical signal having a corresponding one of the grid frequencies. Alternatively, tuners 307, 312, 317, and 320 may be used in conjunction with global tuner, 430, where, for instance, global tuner 430 is used for common-mode tuning and tuners 307, 312, 317 and 320 are used for non-common mode tuning Tuners 307, 312, 317, and 320 may be implemented in a number of different ways. In general, tuners 307, 312, 317, and 320 may operate to change a property or a value of a characteristic of each of optical element. The property or characteristic may include, for example, a refractive index, absorption, center frequency (see below), or optical loss of each optical element. The value of the characteristic may be different for each optical element so that each value must be adjusted by a different amount (a "value adjustment amount"). Accordingly, for example, the value of the refractive index of each optical element may be different, and, thus, each optical element may be tuned by a different amount so that each refractive index value is, in turn, adjusted by a different amount. In another example, the value of the center frequency of each optical element may be different, and, thus, each optical element may be tuned by a different amount so that each center frequency value is adjusted by a different amount.

For instance, each tuner may be a thermal tuner, such as a resistive heater (for example, a thin film heater including platinum or other know material), that changes the center frequency of its corresponding optical element by changing the temperature (e.g., by heating) of the optical element. Alternatively, tuners 307, 312, 317, and 320 may include tuners that operate based on other techniques. For example, a voltage may be applied across an optical element to create stress that changes the center frequency of the optical element. Alternatively, for applicable optical elements such as Mach-Zehnder modulators (MZMs), carriers may be injected or electro-optic techniques may be used to change the center frequency. In addition, tuning may be achieved by applying a voltage that shifts the bandgap of one or more materials that make-up each optical element. Such bandgap shifting may be used, for example, in optical devices that are reversed biased. In some implementations, various combinations of thermal tuning, tuning by applying electrical stress, or tuning via carrier injection, may be used. For instance, laser 305 may be tuned by thermal tuning and modulator 310 may be tuned using electrical stress. Thus, the optical elements can potentially each be tuned using a different type of tuner. Additionally, tuners of the same type may, between different optical elements, have different configurations, such as different thermal tuners may have different power capacities. Thermal tuning may also be achieved by selectively cooling each optical element. In that case, one or more thermoelectric coolers (TECs) may be provided for each optical element in addition to or instead of the heaters discussed above.

In FIG. 3a, separate tuners are shown for each of the optical elements (laser 305, modulator 310, SOA 315, and multiplexer 114) in an optical path. In some implementations, however, some of the elements may not be associated with tuners or multiple optical elements may be tuned with a single tuner or multiple tuners may be associated with a single optical element. As further shown in FIG. 3a, for example, a global tuner 430 may be provided for systematic tuning of Tx module 110.

Figure 3B:
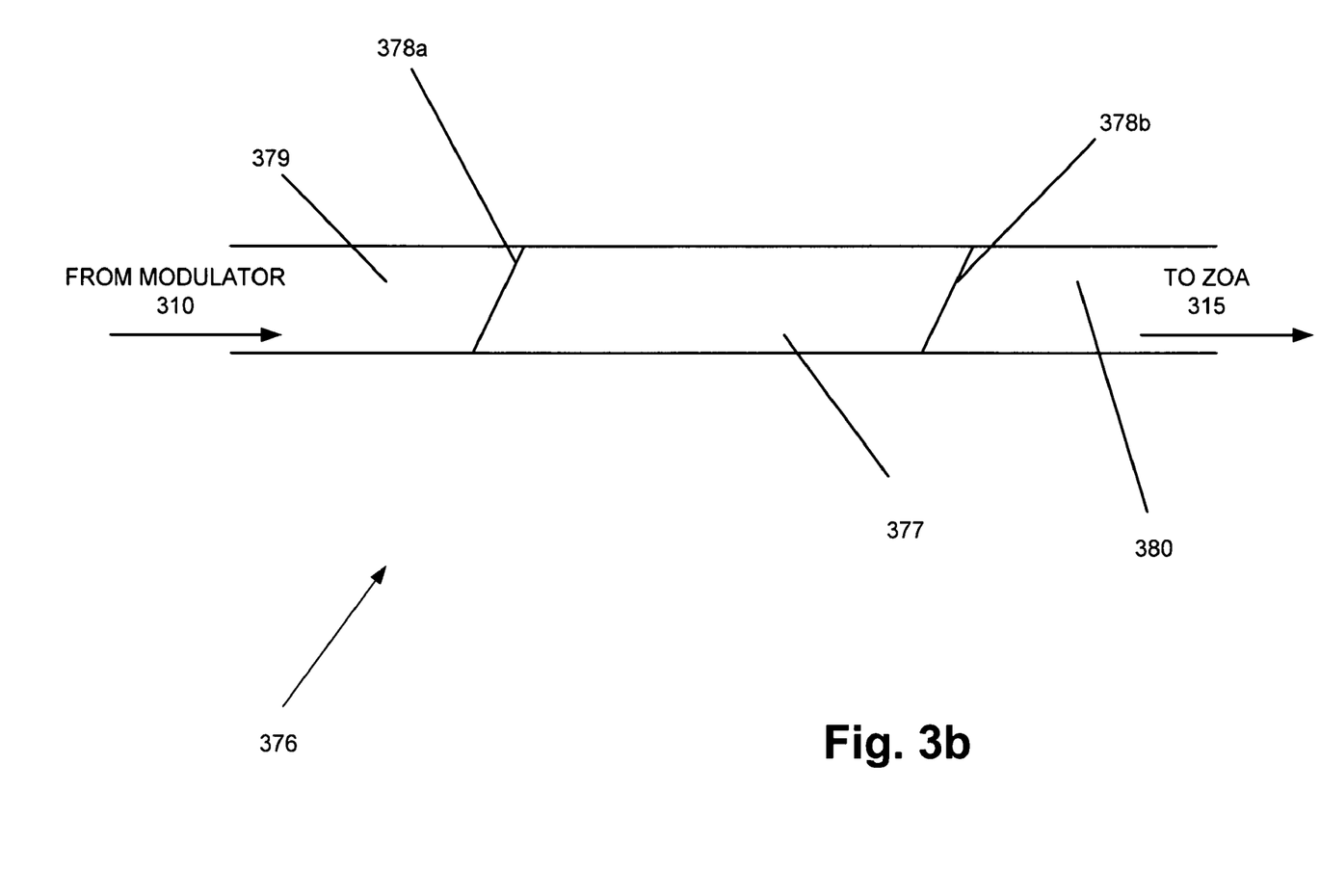
FIG. 3b illustrates an example of a reflection suppression butt-joint.

Reflection suppress structures that reduce reflections of the optical signals propagating in the PIC may also be provided. FIG. 3b shows an example of one such reflection suppression structure that may further be included along waveguide 376. In particular, waveguide 376 may include section 377 that connects an output 379 from modulator 310 with an input 380 to ZOA 315. Angled butt joints 378a and 378b may be provided at the interfaces with input 379 and output 380. Alternative reflection suppression structures are disclosed in U.S. patent application Ser. No. 12/058,652. Other known reflection suppression structures, such as anti-reflective coatings may also be provided.

Figure 4:
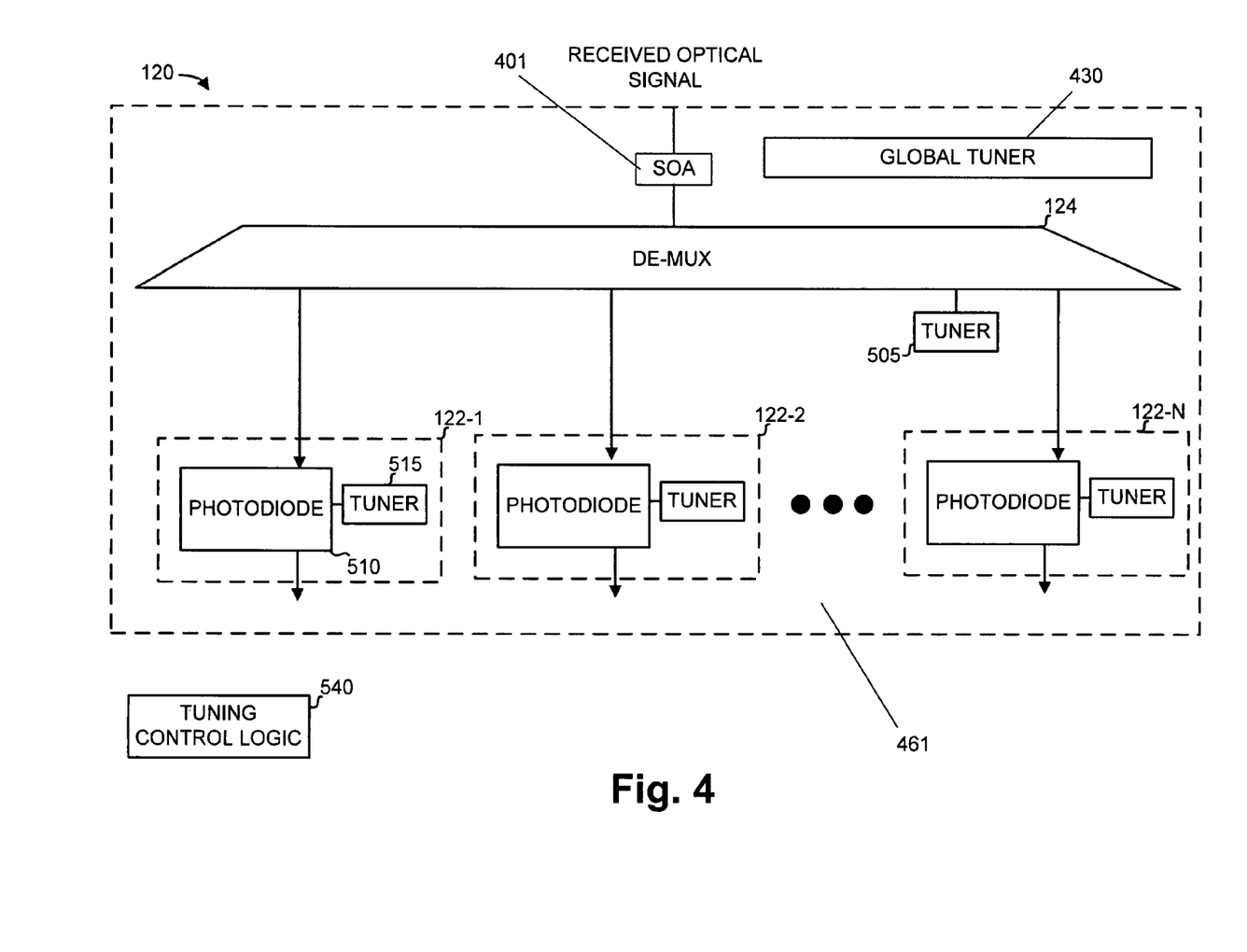
FIG. 4 is a diagram illustrating exemplary elements in a receive module

FIG. 4 is a diagram illustrating exemplary elements in Rx module 120. The optical signal received over link 130 may be input to demultiplexer 124 via a ZOA 401. Demultiplexer 124 may split the incoming optical signal into N optical signal channels in a known manner, and a ZOA may be located after the demultiplexer or may be split into multiple sections. Optical receivers 122-1 through 122-N may each operate to convert the input optical signal to an electrical signal that represents the transmitted data. A receiver PIC having a demultiplexer is described in U.S. Pat. No. 7,116,851, the entire contents of which are incorporated herein by reference. Preferably, SOA 401, demultiplexer 124, tuner 430, photodiodes 510, and tuners 115 are provided on a substrate 461 or as a hybrid where the photodiode material system is different from the substrate. Photodiodes 510 may either be a band-gap photodiode, band-edge photodiode or avalanche photodiode (APD).

Demultiplexer 124 may be associated with a tuner 505. Demultiplexer 124 may include an arrayed waveguide grating (AWG) demultiplexer coupled to tuner 505 to allow tuning of the waveguide grating of demultiplexer 124. Tuner 505 may be used to tune demultiplexer 124 in a manner similar to the tuners shown in FIG. 3. In particular, tuner 505 may tune demultiplexer 124 based on thermal tuning, tuning by the application of stress (e.g., applying an electric potential), tuning by carrier injection, or tuning based on electro-optic techniques.

Each of optical receivers 122, such as optical receiver 122-1, may include a photodiode 510 and a tuner 515. Photodiode 510 may act to convert the input optical signal channel into an electrical signal (i.e., a current or voltage signal). Tuner 515 may be used to tune photodiode 510 and may be implemented in a manner similar to tuner 505.

Tuning control logic 540 is also shown in FIG. 4 and may be coupled to Rx module 120. Tuning control logic 540 may control or program the tuners, such as tuners 505 and 515, which can be used for common-mode and non-common mode tuning similar to that described above in connection with FIG. 3a. Although not explicitly shown in FIG. 4, tuning control logic 540 may connect to each of the tuners shown in FIG. 4. In some implementations, tuning control logic 540 may be implemented as a component separate from Tx module 110. A user may initially connect tuning control logic 540 to Rx module 120 when initially configuring Rx module 120. In other implementations, tuning control logic 540 may be implemented as part of Rx module 120.

In addition to tuning of Tx module 110 and Rx module 120 using the tuners described above with respect to FIGS. 3 and 4 in some implementations, optical elements in Tx module 110 and/or Rx module 120 may be chirped to provide additional control over the output frequency grid. Chirping in conjunction with tuning may be advantageous in extending the performance of Tx module 110 and/or Rx module 120 across a wider tuning range. As noted above, a "chirped" optical element refers to an optical element in which a dimensional and/or electro-optic parameter value of the optical element, such as the value of the length, width, height or thickness of the optical element varies from one optical path to the next. For example, the value of the length of each ZOA in each optical path may be different. Alternatively, electro-optic parameters associated with each optical element may also be chirped from one optical path to the next. Such electro-optic parameters may include, for example, the gain or gain spectrum associated with the optical element.

Figure 5:
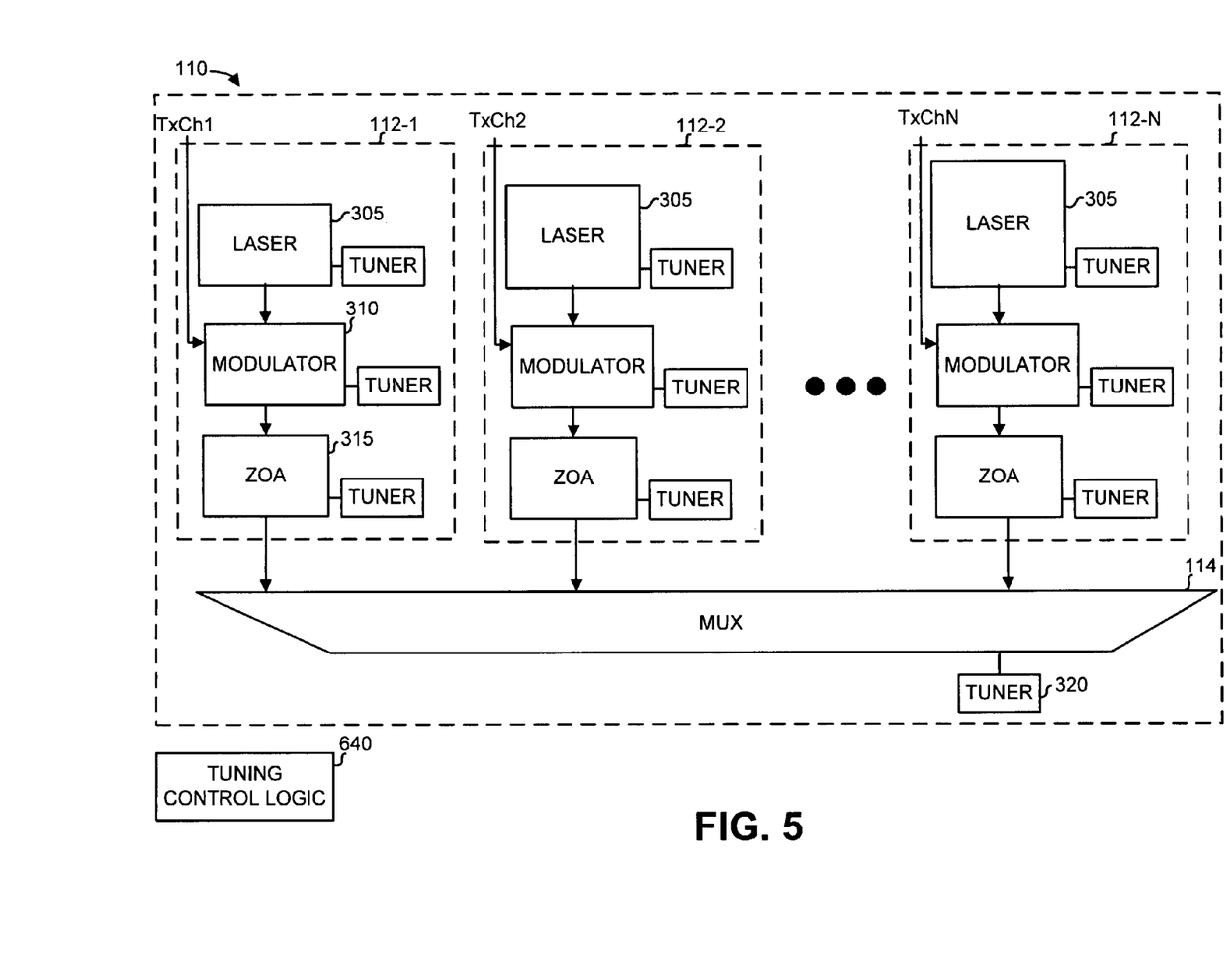
FIG. 5 is a diagram illustrating exemplary elements in a transmit module according to an implementation using chirped elements.

FIG. 5 is a diagram illustrating exemplary elements in Tx module 110 according to an implementation using chirped elements. Each of the optical transmitters shown in FIG. 5 may be similar to optical transmitters 112, as shown in FIG. 3a. In addition, however, various optical components along a given optical path associated with each optical transmitter 112 may be chirped. For example, certain optical elements of each optical transmitter 112 may have a different length. Or the width may be chirped or, if flared, the flare may be different for each optical element. Chirping may be used to, for example, change the active waveguide length of one or more of laser 305, modulator 310, and/or SOA 315. This is particularly illustrated in FIG. 5, in which lasers 305 in different optical transmitters 112 are illustrated as being of a different length.

Tuning control logic 640 is also shown in FIG. 5. Tuning control logic 640 may be implemented similarly to tuning control logic 340 (FIG. 3a). The tuners and optical elements in FIG. 5 are similar in structure and function to those shown in FIG. 3a. The chirped elements shown in FIGS. 5 and 6 may increase or enhance the tuning range of the PIC.

Figure 6:
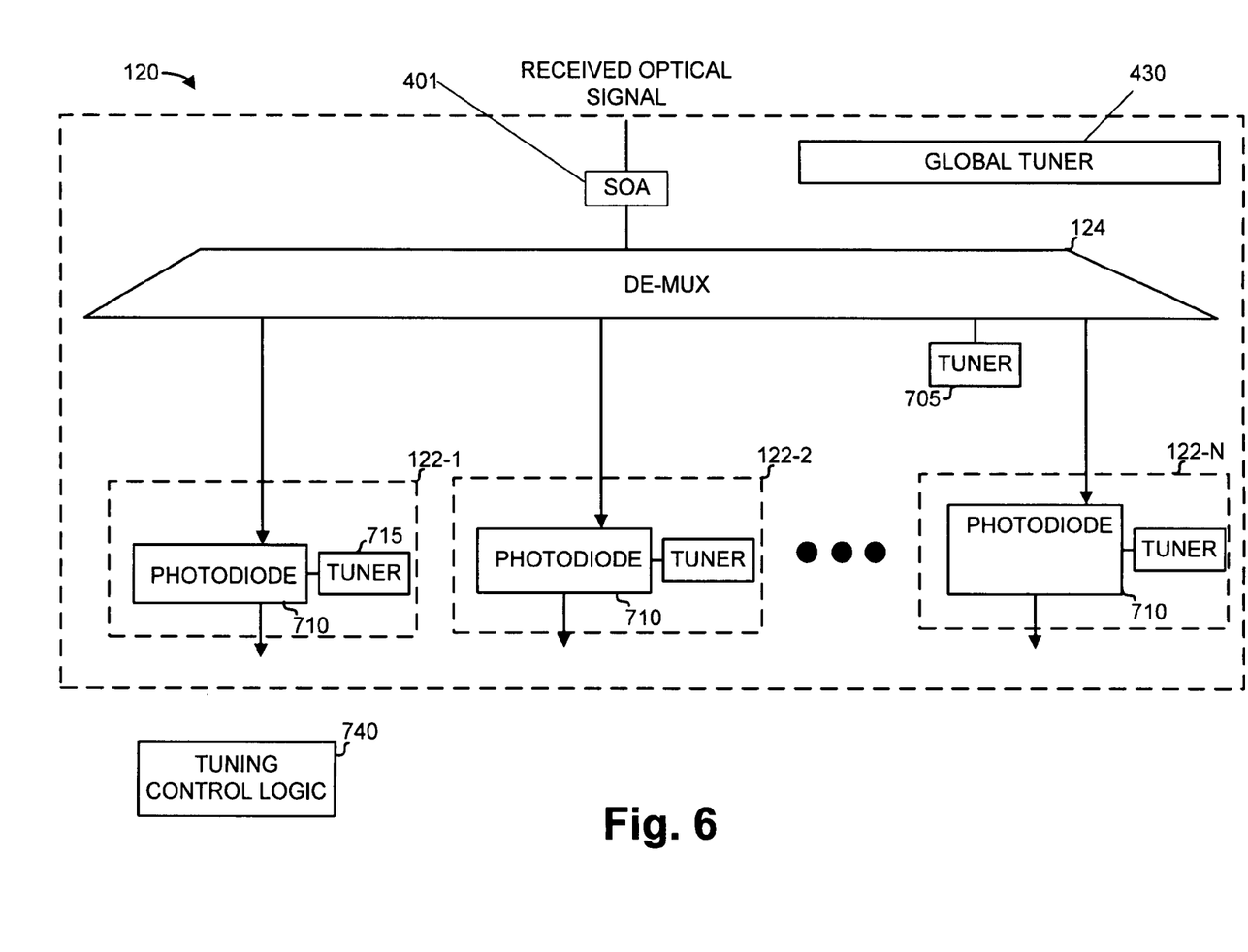
FIG. 6 is a diagram illustrating exemplary elements in a receive module according to an implementation using chirped elements.

FIG. 6 is a diagram illustrating exemplary elements in Rx module 120 according to an implementation using chirped elements. The optical signal received over link 130 may be input to demultiplexer 124 and split into its N optical signal channels. Optical receivers 122-1 through 122-N may each operate to convert the input optical signal to an electrical signal that represents the transmitted data. The tuners and optical elements shown in FIG. 6 are similar in structure and function to those shown in FIG. 4

Demultiplexer 124 may be associated with a tuner 705. Demultiplexer 114 may include an arrayed waveguide grating (AWG) demultiplexer coupled to tuner 705 to allow tuning of the waveguide grating of demultiplexer 124. Tuner 705 may be used to tune demultiplexer 124 in a manner similar to the tuners shown in FIG. 4. In particular, tuner 705 may tune demultiplexer 124 based on thermal tuning, tuning by the application of stress (e.g., applying an electric potential), tuning by carrier injection, or tuning based on electro-optical techniques.

Each of optical receivers 122, such as optical receiver 122-1, may include a photodiode 710 and a tuner 715. Photodiode 710 may act to convert the input signal for each optical path into an electrical signal (i.e., a current or voltage signal). Each optical path in FIG. 7 that couples an output of the demultiplexer to a corresponding photodiode 710 may be chirped to have a different optical loss, as discussed above. Tuner 715 may be used to tune photodiode 710 and may be implemented in a manner similar to tuner 515 (FIG. 4).

Photodiodes 710 in the different Rx modules 122-1 through 122-N may be implemented to each be chirped, wherein a dimensional parameter and/or electro-optic parameters varies from one photodiode 710 to the next. For example, the active waveguide length of each of photodiodes 710 may be different. The different lengths for photodiodes 710 are represented in FIG. 6 by the blocks that represent photodiodes 710 having different heights.

Rx module 120 may include additional components other than those shown in FIG. 6. For instance, Rx module 120 may include a ZOA provided at the output of demultiplexer 124, which may also be associated with a chirp and/or a tuning element.

Tuning control logic 740 is also shown in FIG. 6. Tuning control logic 740 may be implemented similarly to tuning control logic 640 (FIG. 5). That is, tuning control logic 740, shown in FIG. 6, control the tuners based on look-up tables or by continuous monitoring of the tuners over the life of the PIC.

Figure 7:
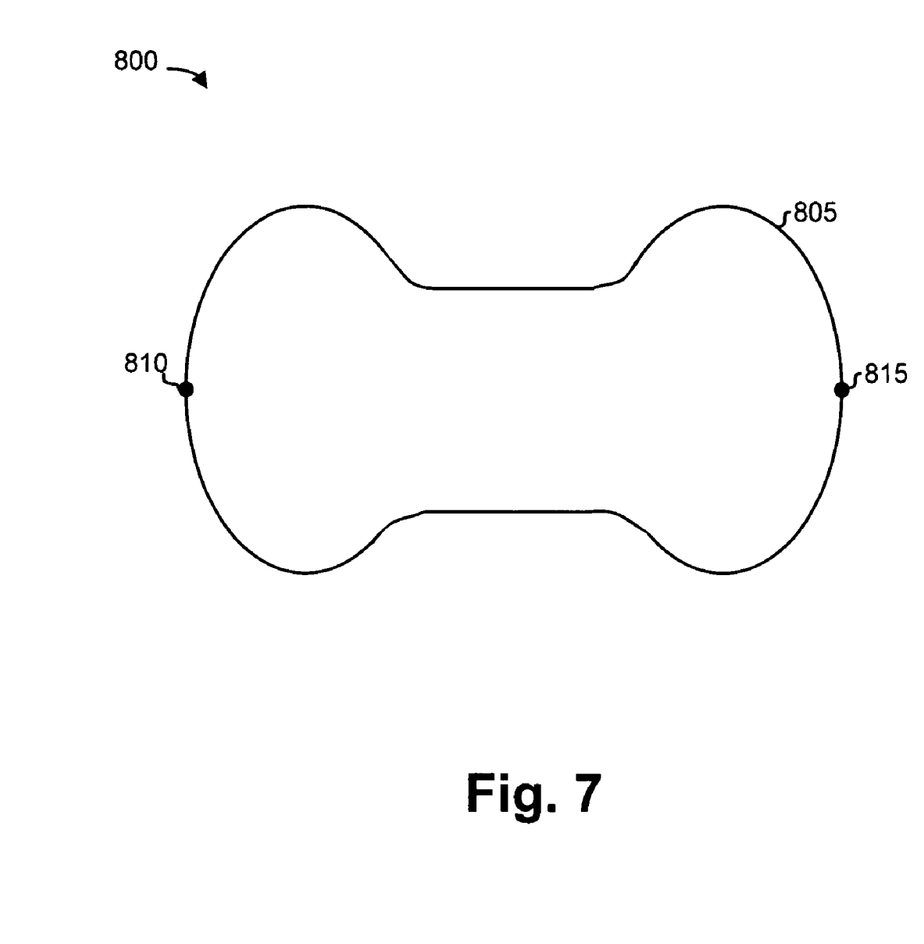
FIG. 7 is a diagram illustrating an exemplary implementation of a tuner based on heating elements.

FIG. 7 is a diagram illustrating a possible implementations of a thermal tuner, labeled as tuner 800. Tuner 800 may represent a tuner such as any of the tuners shown in FIGS. 3-7. Tuner 800 may include a resistive heating pad 805, a first electrode 810, and a second electrode 815. Resistive heating pad 805 may include a resistive material that generates heat when current is passed through the resistive material. In one possible implementation, the resistive material may include platinum. Alternative resistive materials include, but are not limited to, TiN, TaN, Ni, TiWN, and W. First electrode 810 and second electrode 815 may provide the contacts for transferring current through heating pad 805. Tuner 800 may be implemented as, for example, by deposition of resistive metals as part of Tx module 110 or Rx module 120.

Heating pad 805 may be implemented as a structure that includes rounded corners. Rounded corners may advantageously tend to have higher tuning capacity. As particularly shown, heating pad 805 is particularly implemented as a dumbbell shape. In alternate implementations, other shapes that do not include sharp corners (e.g., oval or circular) could also be used. Heating pads with sharp corners may also be used, but with lower heating capacity.

As noted above, Tx module 110 or Rx module 120 may be tuned to obtain the desired frequency grid. For instance, in the context of FIG. 3a, tuning control logic 340 may control one or more of tuners 307, 312, 317, and 320 at the different optical transmitters 112 to adjust the wavelengths of optical signals output from Tx module 110. As noted above, two metrics or optical parameters that may be used by tuning control logic 340 to judge performance of the Tx/Rx modules may be bit error rate (BER) and output power for each optical signal. By individually adjusting the tuners and optimizing performance over all of the optical paths it may be possible to maintain or exceed a desired performance level of these metrics across a relatively wide tuning range. For example, a desired power level or BER may be obtained across the tuning range. In some implementations, the desired frequency grid may be tuned in the field by the end-user or over-life compensation by control algorithm. In other implementations, the frequency grid may be tuned by the manufacturer of Tx module 110 or Rx module 120. In order to monitor the wavelengths of the optical signals output from Tx module 110, frequency detection and wavelength locking circuitry may be provided on PIC 112, as described, for example, in U.S. Pat. No. 7,471,857, the entire contents of which are incorporated herein by reference. The wavelength locking circuitry may be coupled to logic 340 and optical sources or lasers 305. As generally understood, the wavelength locking circuitry may include, for example, monitoring photodiodes, such as PIN photodiodes, to provide monitoring or sense signals to tuning control logic 340 (see FIG. 3a). Alternatively, the wavelength locking circuitry, as well as the monitoring photodiodes, may be provided off transmitter PIC 112. The wavelength locking circuitry may be coupled to lasers 305 and/or tuner 307 to supply further control signals for maintaining or adjusting lasers 305 to be at desired wavelengths.

CONCLUSION

Optical transmit and receive PICs were described that can include individually tunable optical elements. The tunable optical elements can be used to customize the frequency grid for the PICs while still meeting or exceeding performance requirements. The ability to customize the PICs can allow for more rapid deployment of the PICs without demanding a large inventory.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 9, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware can be designed to implement the embodiments based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network device, comprising:
    a substrate;
    a plurality of optical sources provided on the substrate, each of the plurality of optical sources supplying a corresponding one of a first plurality of optical signals, each of the first plurality of optical signals having a corresponding one of a first plurality of wavelengths, the first plurality of wavelengths conforming to a first channel grid, each of the first plurality of optical signals having a predetermined optical parameter value, each of the plurality of optical sources further being configured to output a second plurality of optical signals, each of which having a corresponding one of a second plurality of wavelengths, the second plurality of wavelengths conforming to a second channel grid that is spectrally shifted relative to the first wavelength grid;
    a plurality of optical elements provided on the substrate, each of the plurality of optical elements providing an optical wavelength modulated with a data;
    a plurality of tuning elements, each of which being configured to modify a property associated with a corresponding one of the plurality of optical elements, such that, when the plurality of optical sources supplies the second plurality of optical signals, each of the second plurality of optical signals has the predetermined optical parameter value.

2. A network device in accordance with claim 1, further including a global tuning element configured to further modify the property, the global tuning element being coupled to each of the plurality of optical elements.

3. A network device of claim 1, wherein each of the plurality of optical elements has a corresponding one of a plurality of dimensional parameters values, each of the plurality of dimensional parameter values being different from one another.

4. A network device of claim 1, wherein each of the plurality of optical elements has a corresponding one of a plurality of electro-optic parameters values, each of the plurality of electro-optic parameter values being different from one another.

5. A network device in accordance with claim 1, further including a plurality of waveguides, each of which being coupled to a corresponding one of the plurality of optical sources, each of the plurality of waveguides having a different optical loss.

6. A network device in accordance with claim 1, wherein each of the plurality of tuning elements has a corresponding one of a plurality of resistance values, each of the plurality of resistance values being different from one another.

7. A network device in accordance with claim 1, further including a multiplexer, a transmission spectrum of the multiplexer being substantially fixed over a predetermined range of temperatures.

8. A network device in accordance with claim 1, further including a reflection suppression structure.

9. The network device of claim 1, wherein the predetermined optical parameter value is a bit error rate (BER).

10. The network device of claim 1, wherein the predetermined optical parameter value is a power level.

11. The network device of claim 1, wherein the dimensional parameter value is a length value.

12. The network device of claim 3, wherein the dimensional parameter value is a width value.

13. The network device of claim 1, wherein the property associated with each of the plurality of optical elements is a center wavelength.

14. The network device of claim 1, wherein the electro-optic parameter includes a refractive index.

15. The network device of claim 1, wherein the electro-optic property associated with each of the plurality of optical elements includes a gain spectrum of the plurality of optical elements.

16. The network device of claim 1, wherein one of the plurality of tuning elements is configured to:
    vary a temperature of one of the plurality of optical elements;
    induce a stress of said one of the plurality of optical elements;
    inject carriers into said one of the plurality of optical elements;
    vary a bias voltage applied to said one of the plurality of optical elements; or
    vary an electric field applied to said one of the plurality of optical elements.

17. The network device of claim 1, where the plurality of optical elements include:
    a laser
    an optical modulator,
    a ZOA,
    an optical multiplexer, or
    power monitor photodiodes.

18. The network device of claim 1, wherein each of the plurality of tuning elements includes a heating element having a dumbbell shape.

19. The network device of claim 1, wherein each of the plurality of tuning elements includes a heating element, a contour of the heating element having rounded corners.

20. The network device of claim 1, wherein the first and second wavelength grids comply with an International Telecommunications Union (ITU) grid.

21. The network device of claim 1, wherein substrate includes, a III-V semiconductor material, a II-VI semiconductor material, or silicon.

22. The network device of claim 1, wherein each of the plurality of optical elements includes InGaAsP, AlInGaAs, or GaInNAlAsSb material system based devices.

23. The network device of claim 1, further including control logic, wherein, in response to an output from the control logic, the control logic being configured to provide an output for controlling the plurality of tuning elements.

24. A network device of claim 23, further including circuitry coupled to each of the plurality of optical sources and the control logic, the circuitry being configured to adjust said each of the plurality of wavelengths.

25. A network device, comprising:
    a substrate;
    an optical demultiplexer provided on the substrate, the optical demultiplexer having a plurality of outputs and being configured to receive a wavelength division multiplexed (WDM) signal including a first plurality of optical signals, each of the first plurality of optical signals having a corresponding one of a first plurality of wavelengths, the first plurality of wavelengths conforming to a first wavelength grid, each of the first plurality of optical signals having a predetermined optical parameter value, the optical demultiplexer being further configured to receive a second plurality of optical signals, each of which having a corresponding one of a second plurality of wavelengths, the second plurality of wavelengths conforming to a second wavelength grid that is spectrally shifted relative to the first wavelength grid, the optical demultiplexer being configured to supply each of the first plurality of optical signals or each of the second plurality of optical signals at a corresponding one of the plurality of outputs;

a plurality of photodiodes provided on the substrate being coupled to a corresponding one of the plurality of outputs; and at least one tuning element being configured to modify a property associated with one of the optical multiplexer or one of the plurality of photodiodes, such that, when the plurality of outputs supplies the second plurality of optical signals, each of the second plurality of optical signals has the predetermined optical parameter value.

26. A network device in accordance with claim 25, wherein one of a dimensional parameter and an electro-optic parameter associated with each of the plurality of photodiodes differs for each of the plurality of photodiodes.

27. A network device in accordance with claim 25, wherein each of the plurality of photodiodes has a corresponding one of a plurality of dimensional parameter values, each of the plurality of dimensional parameter values being different from one another.

28. A network device in accordance with claim 25, further including a reflection suppression structure.

29. A network device in accordance with claim 1, wherein each of the plurality of optical elements is associated with a corresponding one of a plurality of optical characteristic values, each of the plurality of optical characteristic values being different from one another.

30. A network device in accordance with claim 29, wherein the plurality of optical characteristic values includes a plurality of optical loss values.

31. A network device in accordance with claim 29, wherein the plurality of optical characteristic values includes a plurality of bit error rate (BER) values.

32. A network device in accordance with claim 26, wherein the electro-optic parameter associated with each of the plurality of optical elements includes a bandgap of a material included in each of the plurality of optical elements.

33. A network device, comprising:

a substrate;

a plurality of optical sources provided on the substrate, each of the plurality of optical sources supplying a corresponding one of a first plurality of optical signals, each of the first plurality of optical signals having a corresponding one of a first plurality of wavelengths, the first plurality of wavelengths conforming to a first channel grid, each of the first plurality of optical signals having a predetermined optical parameter value, each of the plurality of optical sources further being configured to output a second plurality of optical signals, each of which having a corresponding one of a second plurality of wavelengths, the second plurality of wavelengths conforming to a second channel grid that is spectrally shifted relative to the first wavelength grid;

a plurality of optical elements provided on the substrate, each of the plurality of optical elements providing an optical wavelength modulated with a data;

a plurality of tuning elements, each of which being configured to change a corresponding one of a plurality of values of a characteristic of the plurality of optical elements by a corresponding one of a plurality of value adjustment amounts, such that, when the plurality of optical sources supplies the second plurality of optical signals, each of the second plurality of optical signals has the predetermined optical parameter value.

* * * * *